United States Patent
Ledet

(10) Patent No.: US 10,515,325 B1
(45) Date of Patent: Dec. 24, 2019

(54) MESSAGE-BASED KEYWORD, PHRASE, AND OBJECT PROCESSOR AND RESOURCE ALLOCATOR

(71) Applicant: Open Invention Network LLC, Durham, NC (US)

(72) Inventor: David Gerard Ledet, Allen, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 613 days.

(21) Appl. No.: 14/838,146

(22) Filed: Aug. 27, 2015

Related U.S. Application Data

(60) Provisional application No. 62/114,152, filed on Feb. 10, 2015.

(51) Int. Cl.
*G06Q 10/06* (2012.01)
*H04L 12/58* (2006.01)
*G06F 16/33* (2019.01)

(52) U.S. Cl.
CPC . *G06Q 10/063118* (2013.01); *G06F 16/3344* (2019.01); *H04L 51/046* (2013.01)

(58) Field of Classification Search
CPC .. G06Q 10/06; G06Q 10/10; G06Q 10/06313; G06Q 10/00; G06Q 40/00; G06Q 40/12; G06Q 10/063; G06Q 10/063118; G06Q 10/067; G06Q 10/103; G06Q 50/08; G06Q 10/06311; G06Q 10/0633; G06Q 10/0637; G06Q 10/06375; G06Q 10/1097; G06Q 20/14; G06Q 30/04; G06Q 10/0635; G06Q 10/06398; G06Q 10/1095; G06Q 20/00; G06Q 20/02; G06Q 20/10; G06Q 20/105; G06Q 20/108; G06Q 20/20; G06Q 20/3674; G06Q 30/0601; G06Q 40/02; G06Q 40/025; G06Q 40/10; G06Q 40/123; G06Q 10/047; G06Q 10/063112; G06Q 10/06316; G06Q 10/06395; G06Q 10/087; G06Q 20/102; G06Q 30/00; G06Q 30/06; G06Q 40/06; G06Q 50/01; G06Q 50/184; G06Q 50/188; G06Q 10/02; G06Q 10/04; G06Q 10/063116; G06Q 10/06315; G06Q 10/101; G06Q 10/107; G06Q 20/145; G06Q 20/42; G06Q 30/02; G06Q 30/0251; G06Q 30/0279; G06Q 30/0283; G06Q 30/0611; G06Q 40/08; G06Q 50/16; G06Q 50/182; G06Q 50/20; G06Q 50/18; G06Q 10/20
USPC ......... 705/7.23, 7.22, 7.15, 7.17, 7.12, 7.13, 705/7.11
See application file for complete search history.

(56) References Cited

U.S. PATENT DOCUMENTS

| | | | | |
|---|---|---|---|---|
| 2006/0106675 | A1* | 5/2006 | Cohen | G06Q 10/06 705/26.1 |
| 2009/0235280 | A1* | 9/2009 | Tannier | G06Q 10/00 719/318 |
| 2010/0262452 | A1* | 10/2010 | Gibson | G06Q 10/06311 705/7.14 |

(Continued)

*Primary Examiner* — Jamie H Austin

(57) ABSTRACT

Message-based keyword, phrase, and/or object processing and resource allocation may perform functionality related to the message data, such as keywords, phrases, and/or objects (e.g., images, video, etc.). Based on the keywords, phrases, and/or objects, emails may be modified, project plans may be updated, calendar events may be created, and/or various notifications may be sent to allocate and notify human resources accordingly.

18 Claims, 12 Drawing Sheets

(56) References Cited

U.S. PATENT DOCUMENTS

| | | | |
|---|---|---|---|
| 2013/0007648 A1* | 1/2013 | Gamon | G06Q 10/109 715/771 |
| 2013/0060772 A1* | 3/2013 | Clark | G06N 5/022 707/736 |
| 2013/0151421 A1* | 6/2013 | Van Der Ploeg | G06Q 10/06 705/301 |
| 2015/0143258 A1* | 5/2015 | Carolan | G06F 3/0484 715/752 |
| 2016/0148133 A1* | 5/2016 | Haggar | G06Q 10/0635 705/7.14 |

* cited by examiner

MESSAGE-BASED KEYWORD, PHRASE, AND OBJECT PROCESSOR AND RESOURCE ALLOCATOR

CROSS-REFERENCE TO RELATED APPLICATION

This application claims the benefit of U.S. Provisional Patent Application No. 62/114,152, filed on Feb. 10, 2015. The subject matter of this earlier-filed application is hereby incorporated by reference in its entirety.

FIELD

The present invention pertains to message processing and resource allocation and more particularly, to message-based keyword, phrase, and/or object processing and resource allocation that performs functionality related to the message data, such as keywords, phrases, and/or objects (e.g., images, video, etc.).

BACKGROUND

Applications such as Siebel eMail Response™ allow organizations to manage and respond to a high volume of incoming email. Siebel eMail Response™ uses a communications toolbar to allow agents to initiate outgoing communications and accept incoming communications using any supported communications channel. Email2DB™ is a message parser and message automation solution that reads email messages, database records, Twitter™ feeds, web pages, RSS (i.e., Rich Site Summary or Really Simple Syndication) feeds and other sorts of messages from multiple sources and then extracts information from these messages to a database and performs multiple automated actions. Microsoft SharePoint™ includes a multipurpose set of web technologies backed by a common technical infrastructure. SharePoint™ can provide intranet portals, document and file management, collaboration, social networks, extranets, websites, enterprise search, and business intelligence, as well as system integration, process integration, and workflow automation capabilities.

However, improved message-based processing and resource allocation may be beneficial.

SUMMARY

Certain embodiments of the present invention may provide solutions to the problems and needs in the art that have not yet been fully identified, appreciated, or solved by current resource allocation technologies. For example, some embodiments pertain to the processing of messages by performing functionality related to message data, such as keywords, phrases, and objects (e.g., images, video, etc.), as well as resource allocation.

In an embodiment, a computer-implemented method includes checking, by a computing system, keywords, phrases, or both from text of a message or an object in the message for a word or phrase indicating that the message pertains to a project plan or milestone. When the word or phrase indicates that the message pertains to the project plan or milestone, the computer-implemented method also includes obtaining direct permissions to a project planning application, by the computing system, connecting to the project, by the computing system, accessing a user's project plan data, by the computing system, and retrieving the user's project plan data, by the computing system.

In another embodiment, a computer program is embodied on a non-transitory computer-readable medium. The program is configured to cause at least one processor to check keywords, phrases, or both from text of a message or an object in the message for a word or phrase indicating that the message pertains to a project plan or milestone. When the word or phrase indicates that the message pertains to the project plan or milestone, the program is also configured to cause the at least one processor to access a user's project plan data and retrieve the user's project plan data.

In yet another embodiment, an apparatus includes memory storing computer program instructions and at least one processor communicably coupled to the memory and configured to execute the computer program instructions. The at least one processor is configured to interwork directly with the project planning application or with application programming interfaces (APIs) of the project planning application. The at least one processor is also configured to determine that an employee is leaving prior to a completion date of a project and determine whether internal resources are available to assist with milestones of the project based on the leaving employee's current deliverables. When the internal resources are not available, the at least one processor is further configured to seek external resources by interworking with external data through published APIs or directly with remote data through a network to determine external resources that are currently related to the project, and notify the user when the internal resources or the external resources are available.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
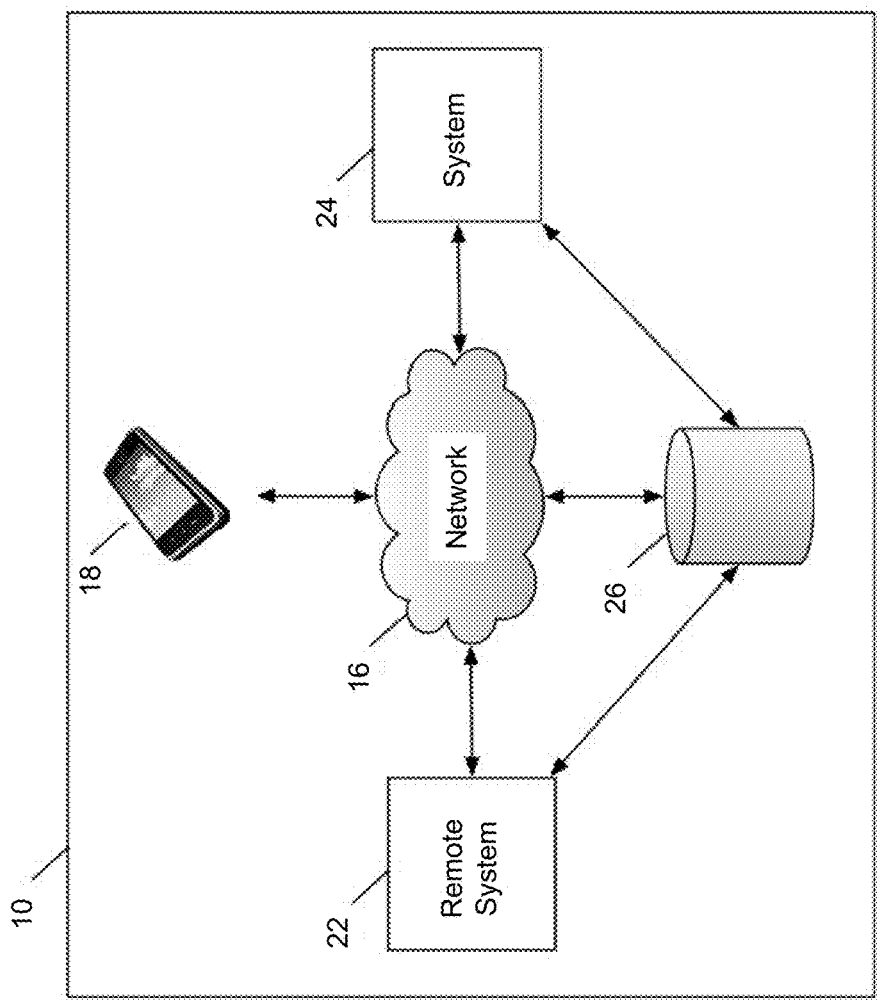
FIG. 1 is an architectural diagram illustrating an overall system, according to an embodiment of the present invention.

FIG. 1 is an architectural diagram illustrating an overall system 10, according to an embodiment of the present invention. Overall system 10 allows a user utilizing a client device 18 to access an application (in the form of software, for example) to be downloaded from system 24 (e.g., a server) or currently residing on client device 18. The "application," as used herein, refers to the message-based keyword, phrase, and/or object processor (e.g., a message processor) and resource allocator of some embodiments. System 24 may be redundant, or be more than a single entity, without deviating from the scope of the application. Client device 18 may be a mobile laptop computer, a personal desktop computer, a cell phone, a wearable device such as a watch, a bracelet, or a headset, an automobile interactive computer, a personal digital assistant (PDA), a tablet computer, an MP3 player, a gaming device (such as a hand held system or home-based system), or any other suitable device.

Client device 18 is connected to a network 16. The user of the application interfaces through client device 18 and connects through network 16 to system 24. Also present in overall system 10 is a remote system 22. Remote system 22 may be any remote server and/or database that is communicably coupled to network 16 and contains user data. Remote system 22 may contain data obtained by Internet-related services provided by such organizations as Google™, Yahoo™, Microsoft™, etc.

A database 26 can be directly connected to system 24 or remotely connected through network 16 without deviating from the scope of the invention. In some embodiments, queued messages are stored in database 26. Database 26 may also be separate entities—e.g., one for remote system 22 and another for system 24. Database 26 may also be, or be a part of, remote system 22 and/or system 24.

The application of some embodiments may reside on client device 18. If the application resides on client device 18, the application may downloaded through a suitable platform, such as an application store or market, residing on or accessed by client device 18. The application in some embodiments may work with any suitable device, such as a personal computer with a touch screen, a laptop with a touch screen, a personal computing tablet, a smartphone, or any suitable device with a processor, memory and a touch screen. In some embodiments, the application functionality partially exists on client device 18 and partially on network 16 (e.g., a cloud), on system 24, and/or on remote system 22.

In some embodiments, the application interworks with the user's messaging application—for example, an email application, instant messaging application, text messaging application, group messaging application, video call application, etc. Incoming messages may be routed to a separate application where additional processing of the message occurs, or the entire functionality may be interworked into the messaging functionality. Some embodiments parse an incoming email so data such as keywords/phrases/objects (e.g., images, videos, multimedia elements, etc.) are extracted and used for further functionality. The extracted data may be utilized to provide additional functionality including, but not limited to, interacting with other applications and/or other data.

Parsing Messages

Incoming messages, such as emails, may be parsed prior to being handled by the message application in client device 18. In some embodiments, messages incoming to client device 18 are parsed by examining the contents in the message and taking action(s) on the contents of the message. Parsing text is the process of traversing through the text, splitting up the words separated by white space, and storing the separated words into a data structure (e.g., an array of characters). These elements are referred to herein as message tokens, where each message token is a word in the user's notification message.

In some embodiments, client device 18 parses through the incoming messages using parsing languages, such as Perl, which allows the application to successfully and effectively process text. The Perl "split" function may be used to break up a line into separate words that can then be further processed as individual words instead of lines or sentences. Parsing the incoming message allows the message to be split into separate words and the words may be filtered into "normal words" and data, such as keywords, phrases, and objects. Further processing may then be performed on this data.

Incoming Messages

Figure 2:
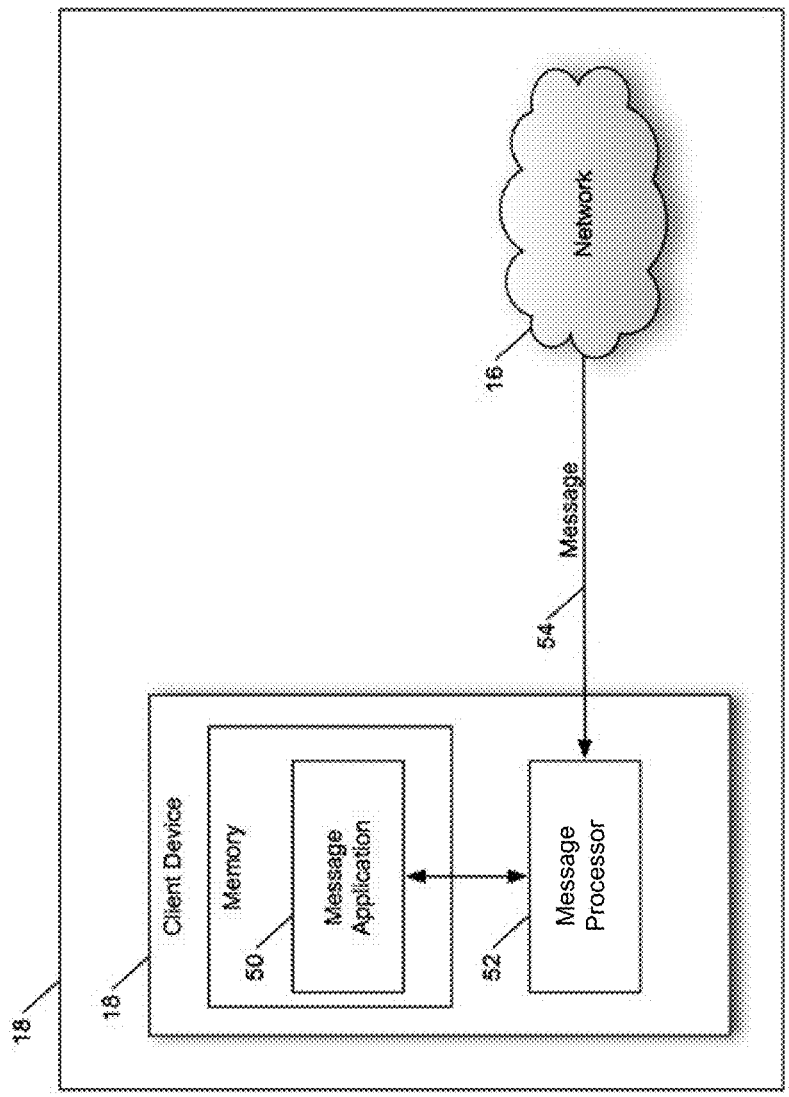
FIG. 2 is an architectural diagram illustrating a client device configured to perform message processing, according to an embodiment of the present invention.

Messages (e.g., emails, instant messages, voicemails, text messages, and the like) may be parsed and keywords, phrases, and/or objects (e.g., certain characters, images, video, etc.) may be obtained from the message. FIG. 2 is an architectural diagram illustrating a client device 18 configured to perform message processing, according to an embodiment of the present invention. Client device 18 may be a mobile device that normally receives messages 54 from network 16. These messages may be any of a number of different message formats and types including, but not limited to, email, SMS text messages, voicemail, images, videos, or any other type of message normally received from an external source.

Messages 54 are received by client device 18 and routed through routing functionality on client device 18 (for example, through the operating system of client device 18) to a message processor 52. In some embodiments, message processor 52 may be located in an application that normally processes messages in client device 18, a separate application in client device 18, the operating system of client device 18, and/or a component that is external to client device 18, such as system 24, a cloud on network 16, remote system 22, or any other suitable computing system or collection of computing systems.

Message processor 52 parses incoming messages. The parsing may include parsing the message for keywords, phrases, and/or objects. Message processor 52 is responsible for the parsing of the message. Keywords, phrases, and/or objects may be extracted from the message and stored either locally or remotely. If stored locally, message processor 52 may store the keywords, phrases, and/or objects in a structure located locally on client device 18 such that other applications on client device 18 may access this data. If stored remotely, messaging functionality may occur between client device 18 and remote storage (e.g., a database), and the messaging may be routed through network 16. Once processed, the message may be forwarded to a normal messaging application 50.

Figure 3:
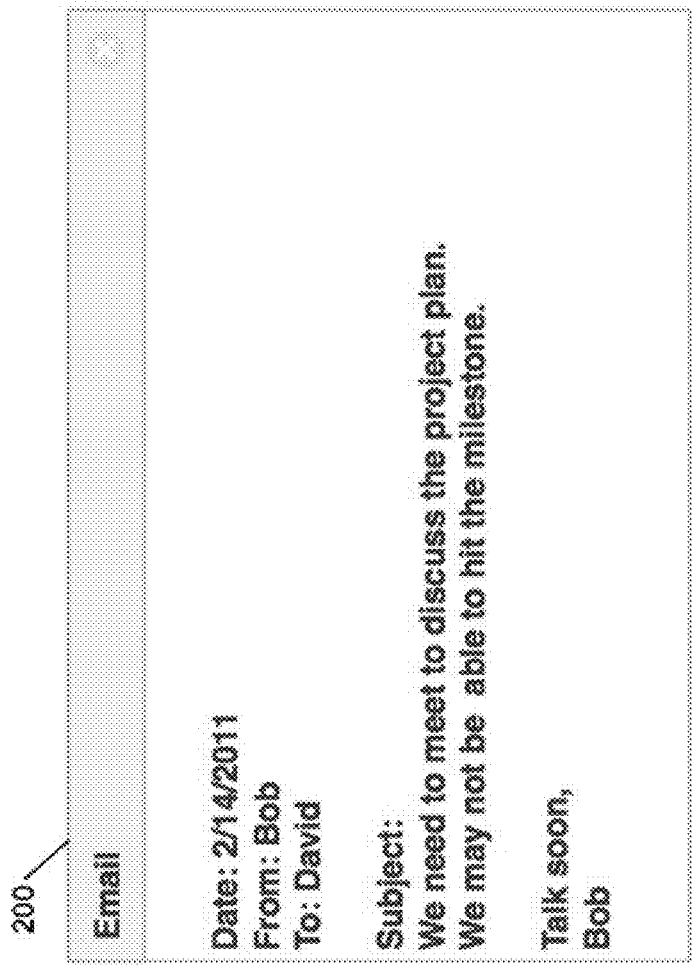
FIG. 3 illustrates an incoming email, according to an embodiment of the present invention.

FIG. 3 illustrates an incoming email 200, according to an embodiment of the present invention. Email 200 is from sent from a user named Bob, who is the sole recipient. The depiction of the email is only for the purposes of illustration, and may not reflect the exact nature of the email as it is displayed on client device 18 in some embodiments. In some embodiments, message processor 52 receives the message, parses the message to determine keywords, phrases, and/or objects, and stores the determined keywords, phrases, and/or objects.

Figure 4:
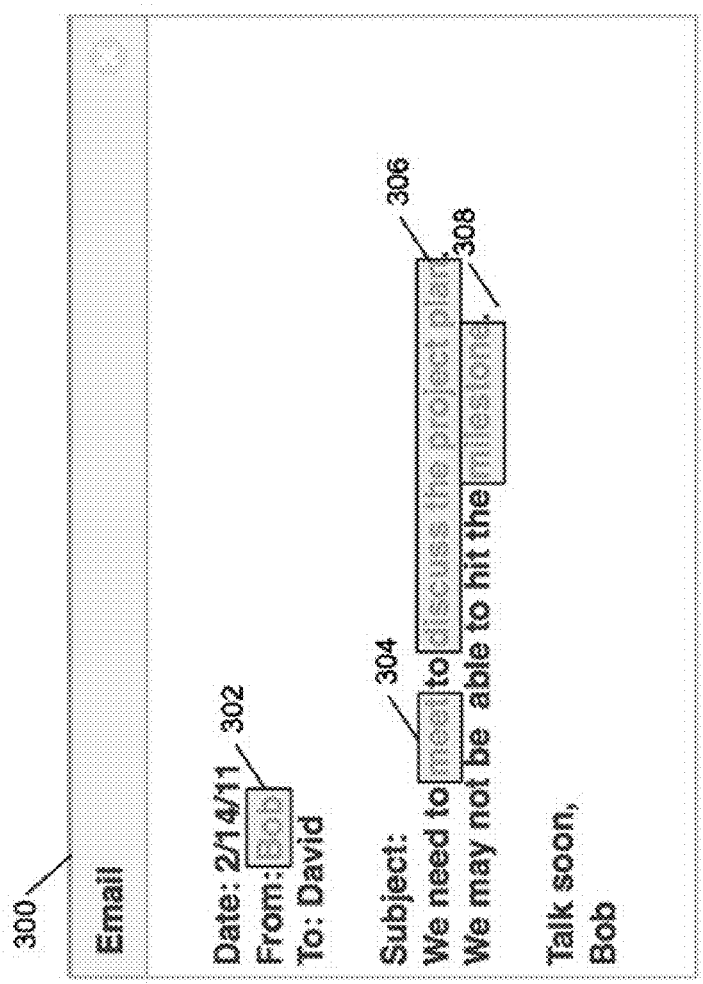
FIG. 4 illustrates keywords and phrases in the incoming email, according to an embodiment of the present invention.

FIG. 4 illustrates keywords and phrases in incoming email 200, according to an embodiment of the present invention. Message processor 52 may parse incoming message 200 and determine the keywords and/or phrases by ignoring the parts of the message that support the determined keywords. Message processor 52 may use functionality such as a semantics engine to search the keywords and/or phrases.

The sender of the email, "Bob," is a keyword 302. Keyword 302 may be related to the details of the sender, including, but not limited to, the sender's email address, the sender's phone number (for instance, when the received message is a text message, a voicemail, a text representation of a voicemail, etc.), or other similar, distinguishing characteristics of the sender of the message. The keyword "meet" 304 is a keyword since it is an action word in the message. The keyword "discuss the project plan" 306 is a phrase since it a subject noun in the sentence and the first sentence is surrounding the concept of the project plan. The keyword "milestone" 308 is another keyword as the message is surrounding the concept of a milestone.

Other keywords, or fewer keywords, may be implemented in the functionality surrounding the determination of the keywords in a given message without deviating from the scope of the present invention. Processing inherent in the application may involve the extraction of the key parts of a message and storing the keywords either locally in the client device or remotely, as previously described. The keywords may be stored in local file storage (e.g., a database or local file system) or remote file storage (e.g., a remote database).

Figure 5:
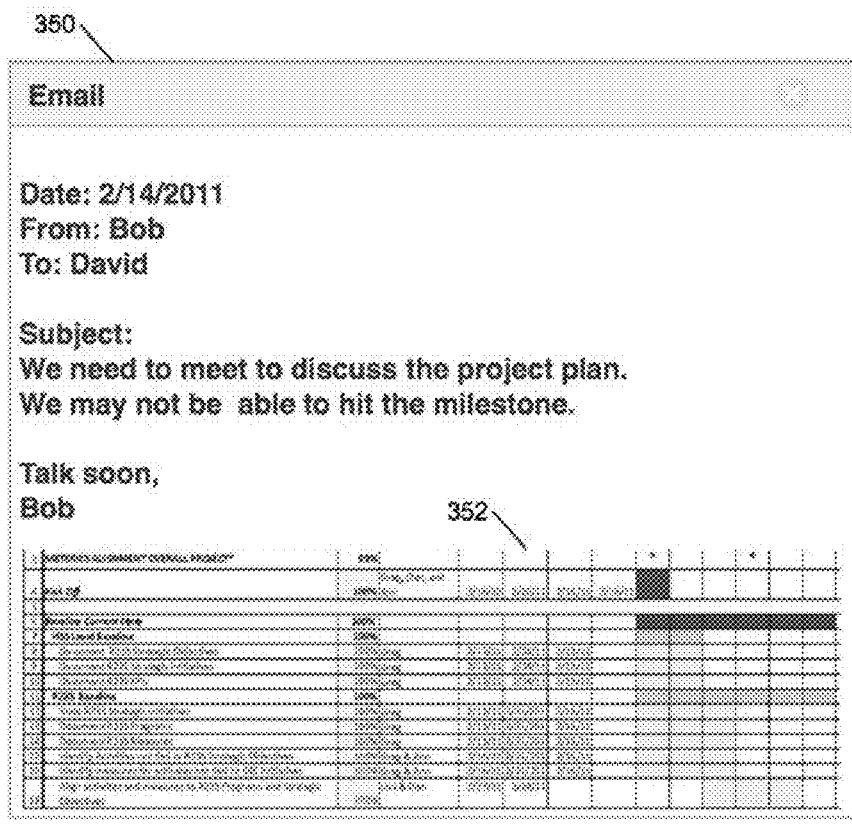
FIG. 5 illustrates an email message with an image, according to an embodiment of the present invention.

In some embodiments, the "object" that is parsed is an image or video. FIG. 5 illustrates an email message 350 with an image 352, according to an embodiment of the present invention. In FIG. 5, image 352 is an image of a project plan that is embedded, attached, or otherwise part of message 350. Using optical character recognition (OCR) functionality, for example, which may be fully or partially located in network 16, client device 18, remote system 22, and/or system 24, or using other object recognition functionality, text in image 352 is detected such that the application is able to determine additional information from the image. A similar process may be employed for video, where OCR is used for multiple frames or all frames.

By parsing image 352, the application may be able to determine more information related to the message. For example, through the text in image 352, the application may determine that Greg has a deadline on 2/16/2011 and the date that the message was received was 2/14/2011. By interacting with database 26 and/or system 24, which may include a human resources database, for example, the application may further use the above information to determine that Greg has turned in a notice to end employment immediately.

Figure 6:
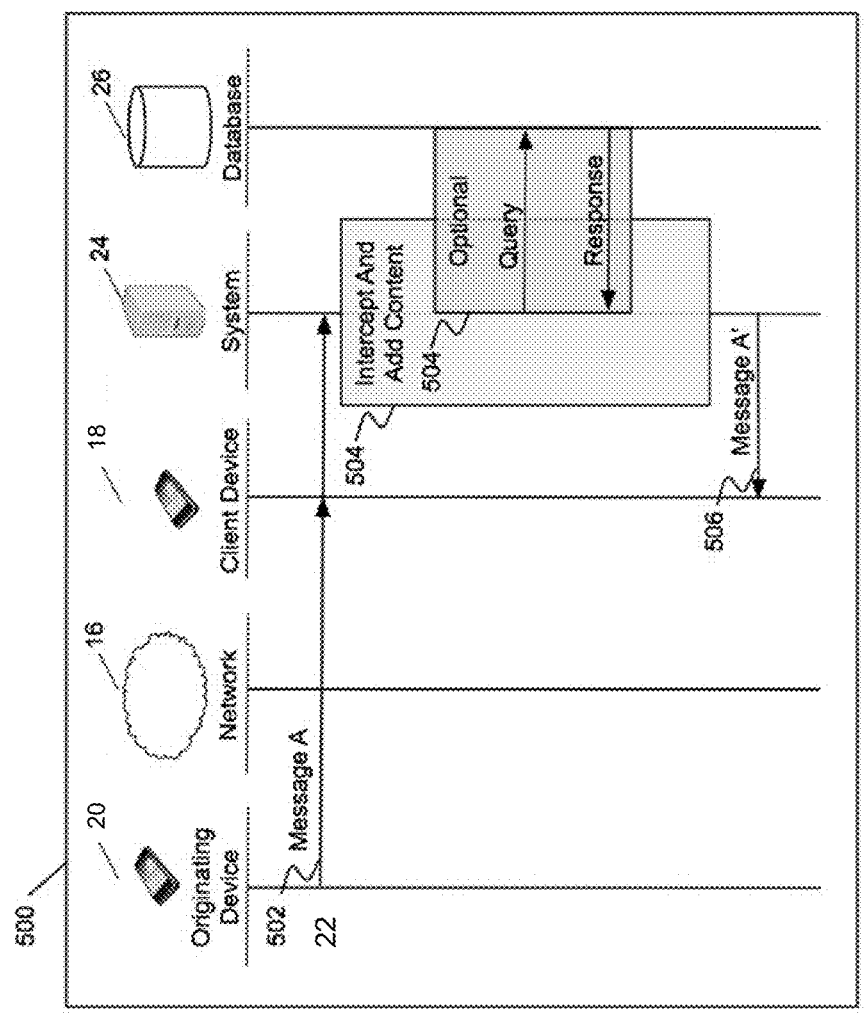
FIG. 6 is a flow diagram illustrating the automatic addition of text to a message, according to an embodiment of the present invention.

FIG. 6 is a flow diagram 500 illustrating the automatic addition of text to a message, according to an embodiment of the present invention. In FIG. 6, an incoming message is intercepted and altered by system 24. Message-A 502 is originated by the user of an originating device 20 and is routed through network 16 to client device 18. Forwarding functionality at client device 18 forwards the message to system 24 in some embodiments. The forwarding functionality may be part of the operating system of client device 18, or may be part of the application residing in memory on client device 18. The forwarding functionality is responsible for sending incoming messages through system 24 before being received at client device 18. The forwarding functionality may also reside in client device 18 without deviating from the scope of the invention.

System 24 intercepts and modifies (e.g., add/delete/alter) the content of Message-A 52 utilizing data internal to system 24 and/or data residing in database 26. Optionally, system 24 may make one or more queries 504 to database 16 to obtain information related to the originator of Message-A 502 and/or the recipient(s) of Message-A 502. System 24 alters Message-A 502 if needed and sends the altered message (Message-A' 506) to the recipient(s) thereof.

Figure 7:
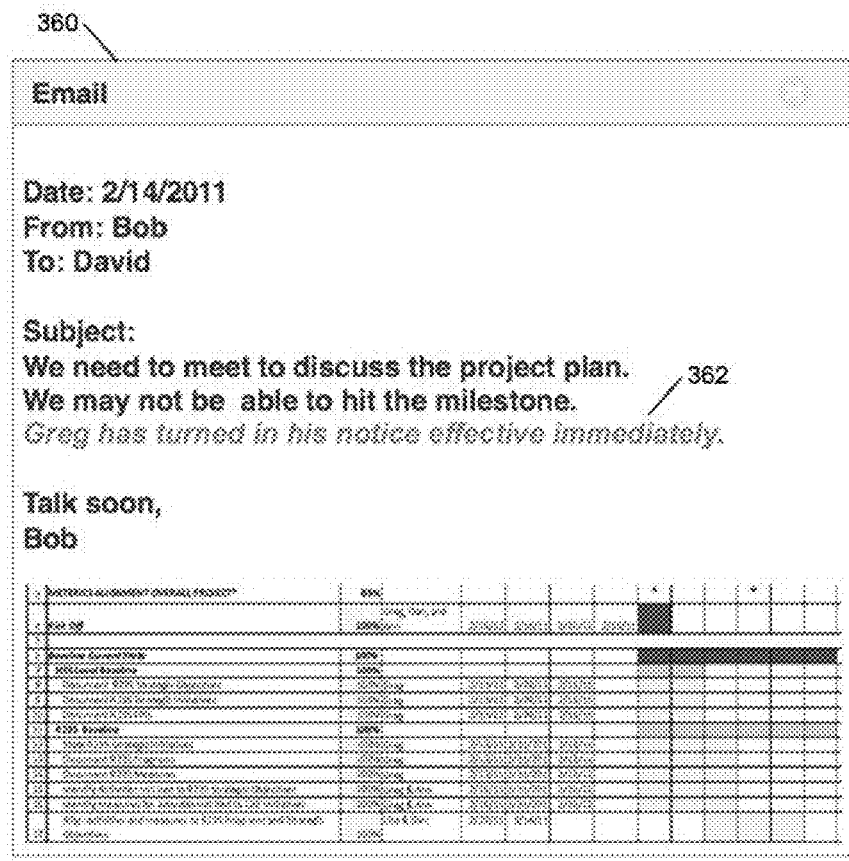
FIG. 7 illustrates an email with automatically added text, according to an embodiment of the present invention.

FIG. 7 illustrates an email 360 with automatically added text 362, according to an embodiment of the present invention. Text 362 has been added to message 360 indicating additional information obtained from database 26 and/or system 24. Added text 362 is different than the normal text in message 360 to indicate to the user that text 362 was not originally included in message 360, but added by the application. Added text 362 can be offset by changing the font/type/size/color or any other method used to highlight text in a message in some embodiments.

Figure 8:
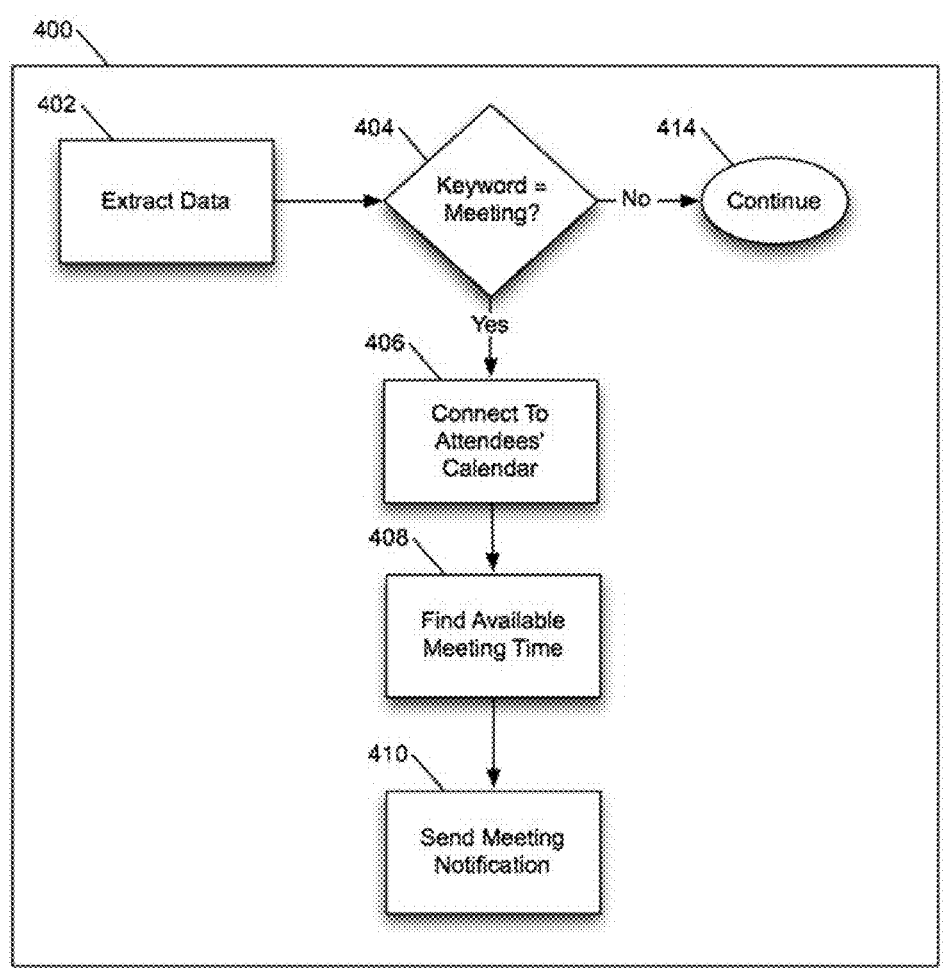
FIG. 8 is a flowchart illustrating a process for processing a keyword for a meeting, according to an embodiment of the present invention.

FIG. 8 is a flowchart 400 illustrating a process for processing a keyword for a meeting, according to an embodiment of the present invention. Data is extracted from the incoming message in message processor 52 at 402. Data, which may include keyword(s), phrase(s), and/or objects may be stored in database 26 and/or any of elements 18-24. A check is made for the keyword "Meeting" at 404. If the word, or a variation of the word, is found at 404, the application obtains access to the user's calendar at 406. This access may be obtained by direct permissions to the application, or via application programming interfaces (API). In either case, the data of the user's calendar application is made available to the application.

The user's calendar is searched for the next available meeting time between the user and the sender of the email at 408. Parameters surrounding the meeting length, time of day, day of week, etc. may be determined beforehand, or during the process without deviating from the scope of the invention. The application interworks with the user's calendar either directly, or through published APIs that may be through messaging through network 16. A meeting notification is then sent to the user and the attendee(s) of the meeting at 410. This notification may be in the form of an email, SMS text, or any other notification sent to announce a new meeting. If the data is not found in the incoming message, the process continues to flowchart 414 in FIG. 9.

Figure 9:
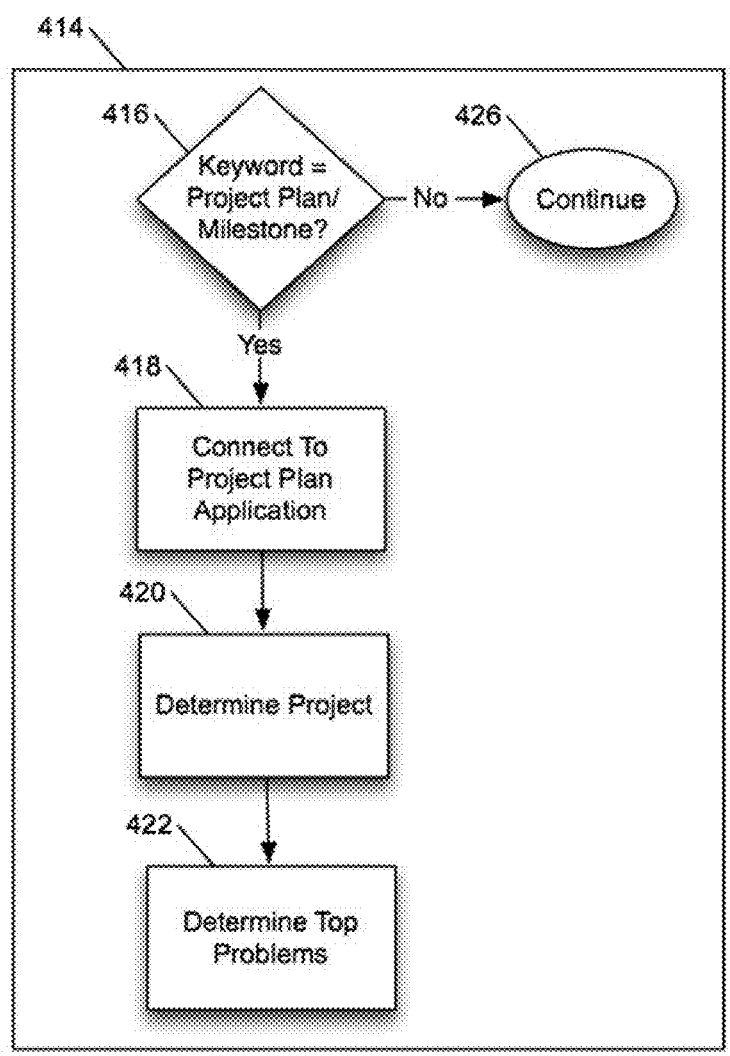
FIG. 9 is a flowchart illustrating a process for processing a keyword for a project plan/milestone, according to an embodiment of the present invention.

FIG. 9 is a flowchart 414 illustrating a process for processing a keyword for a project plan/milestone, according to an embodiment of the present invention. A check is made for data such as keywords and phrases such as "project plan" and/or "milestone" at 416. If the word(s), or a variation of the word(s), is/are found, the application obtains access to the user's project plan data at 418. This access may be obtained by direct permissions to the application, or via an API. In either case, the data of the project plan application is made available to the application.

The issue(s) in the incoming message is/are located utilizing the data such as keywords, phrases, and/or objects in the incoming message at 420/422. This includes connecting to the project at 420. In some embodiments, the project can be one or more of the file that the user has recently accessed or edited, the most recent file (via timestamp) in the user's file system that relates to the project plan application or the application that is determined to be related to the application in the incoming message, the file that was recently referenced in recent messaging of the user, etc.

Obtaining access to project plan data provides the application with detailed data of the project, and more particularly, the details of a specific portion of the project. SharePoint™ is a widely popular project plan application. Through published APIs, $3^{rd}$ party applications are able to interact with the SharePoint™ data and obtain details of the project. For example, the SharePoint™ Representational State Transfer (REST) interface is a Windows™ Communication Foundation (WCF) Data Service that allows the developer to use construct HTTP requests to query SharePoint™ list data. Like all RESTful web services, the SharePoint™ REST interface maps HTTP verbs to the data operations, as shown in Table 1 below.

| SHAREPOINT ™ REST OPERATIONS | |
|---|---|
| HTTP Verb | Data Operation |
| GET | Retrieve |
| POST | Create |
| PUT | Update (update all fields and use default values for any undefined fields) |
| DELETE | Delete |
| MERGE | Update (update only the fields that are specified and changed from current version) |

In the XML result, for example, the collection elements show that it is possible to directly query for project details. The top problems are then determined at 422, the process for which is shown in more detail in FIG. 10. If the keywords and/or phrases and/or objects are not found in the incoming message, the process continues to 426 in FIG. 10.

Figure 10:
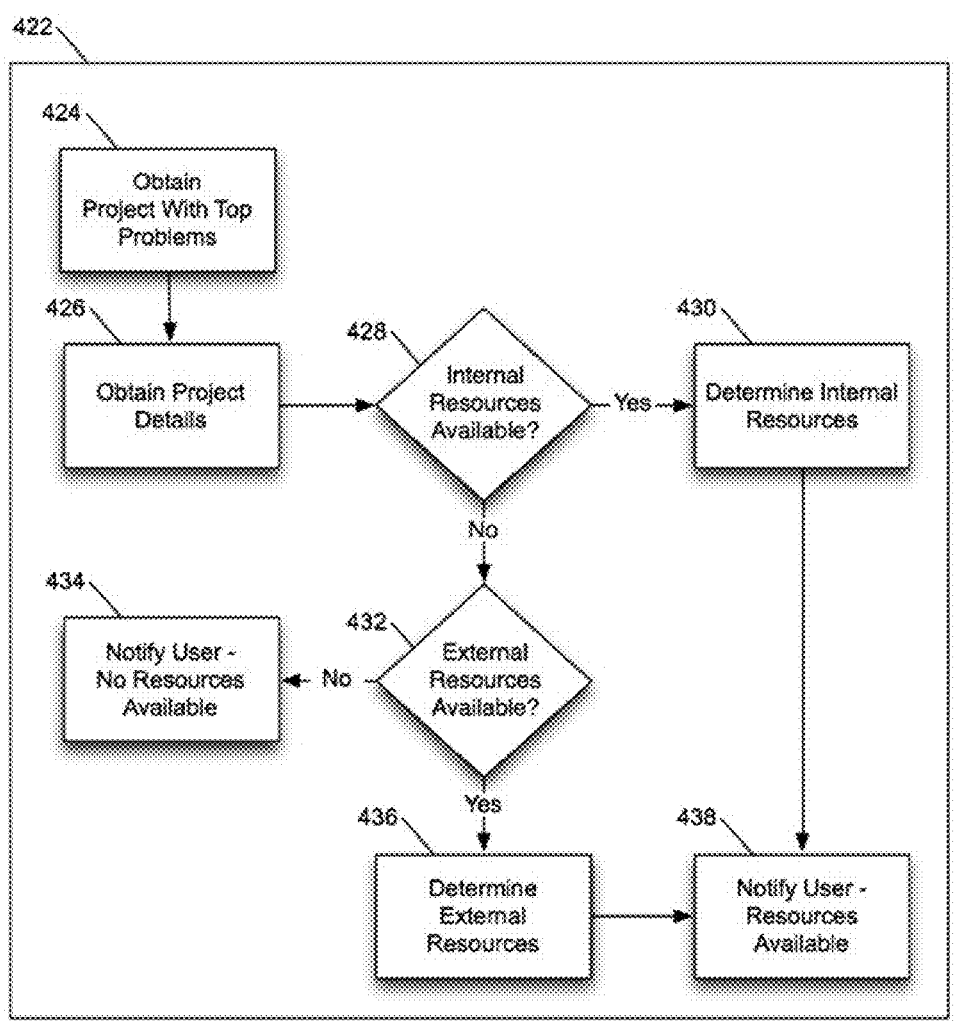
FIG. 10 is a flowchart illustrating a process for determining top problems, according to an embodiment of the present invention.

FIG. 10 is a flowchart 422 illustrating a process for determining top problems, according to an embodiment of the present invention. More specifically, FIG. 10 shows the determination of problems with the project and alternate resources. The access to the project plan application and/or project plan data through a published API is either through local access (e.g., the data is located locally on client device 18) or remotely (i.e., the data is located in remote database 26 and communication occurs between client device 18 and remote database 26 through network 16).

Once the related file is determined, the application interworks with the related application's APIs (for example, the project plan application), or directly with the application to determine the deliverables that are potentially an upcoming problem at 422. The application may seek to determine the current assignments and current deliverable timelines of the person(s) mentioned in the email. In this example, the assignment(s) and milestone(s) are sought at 424 as the keywords and phrases determined in the email were "project plan" and "milestone".

For example, to determine the top problem in the project at 424, by interacting with database 26 and/or system 24 (e.g., a human resources database), the application uses the project date as well as the date that an employee will depart to determine that a problem exists with the project. The application seeks to determine internal resources that may be available to assist in the project's milestones, especially pertaining to those project elements pertaining to Bob's current deliverables at 426 in this example. This may be accomplished by the application calculating the existing milestones and current progress of those people in the project plan using the project plan's data through either direct access to the project plan application or through interfacing with the project plan's API.

The application may also interact with data outside of the project plan data, such as human resources data, employee data, etc., such that the application accesses the data through direct access to the data that may be located in system 24, remote system 22, database 26, an/or data in the cloud of network 16. If internal resources are available at 428, the user is notified of this at 430. This can occur through a notification and/or message where the application includes the data of the internal person(s) available. This may include the current projects of the internal person(s), their current deliverables, etc.

If internal resources are not available at 428, then external resources are sought that may be able to assist the project at 432. External sources may be derived from interworking with external data (for example LinkedIn™, Monster.com™, CareerBuilder.com™, etc.) through published APIs or directly with remote data through network 16. More specifically, the application seeks to determine any external resources are currently related to the project through the interaction of either the project plan application or through the published API of the project management data at 432.

If external resources are available at 432, then which resources are available is determined at 436 user is notified of this at 438. This can occur through a notification and/or message where the application includes the data of the external person(s) available. The data presented in the notification/message may include the credentials of the external candidates, contact information, employment history, etc. If external resources are not available at 434, the user is notified that no internal or external resources are found that may be able to assist in the project milestones.

Figure 11:
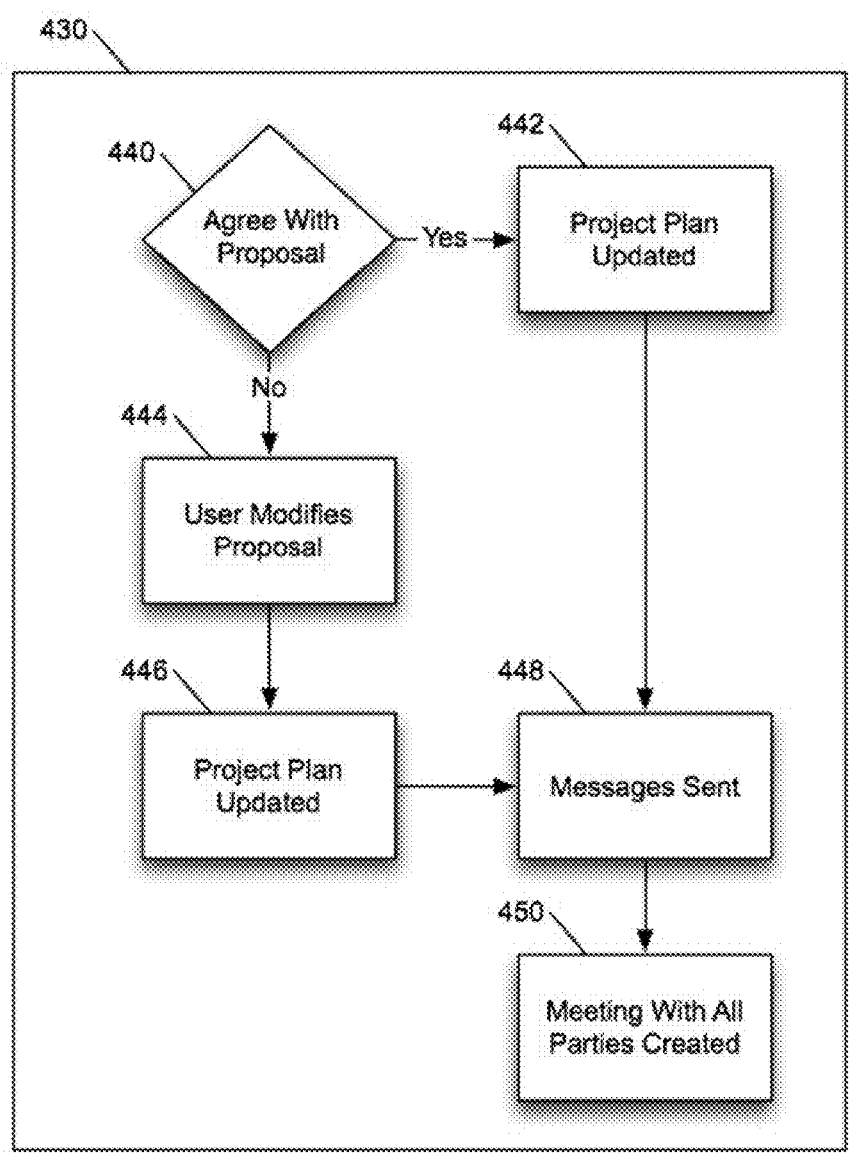
FIG. 11 is a flowchart illustrating a process for notifying a user that internal resources are available, according to an embodiment of the present invention.

FIG. 11 is a flowchart illustrating a process 430 for notifying a user that internal resources are available, according to an embodiment of the present invention. The data presented to the user in the notification message shows the resources (internal and/or external), determined by the application, that are potentially available to assist in the project. The data may be displayed via the application's GUI on client device 18. Components (e.g., button components) may also be included that the user can choose, such as buttons entitled "Agree," "Modify," and "Cancel."

If the proposal is agreed to by the user at 440, for example, by pressing the "Agree" button, the new resource(s)' information may be entered into the project plan application at 442. This process may occur through the interaction with the project plan application's published API or directly with the project plan data either locally or remotely (i.e., through network 16). In some embodiments, a message is automatically forwarded to the user that has the job of updating the project plan, such as the project manager for the project.

If the proposal is not agreed to, the user may modify the data in the proposal at 444 through interaction with the GUI of the application. For example, the user may press the "Modify" button or the "Cancel" button. If the "Modify" button is pressed, the user has the ability to modify the data of the notification through the GUI of the application. For example, the user may select other employees in the organization through a component on the GUI of the current application (for example a drop down component) that lists the employees who are related to the project in the project plan. In some embodiments, the GUI also lists the projects that each employee is currently involved in.

Once the data in the proposal is accepted and modified at 444, the project plan is updated at 446. This process may occur through the interaction with the project plan application's published API, or directly with the project plan data either locally or remotely (through network 16). In some embodiments, a message is automatically forwarded to the user that has the job of updating the project plan, such as the project manager for the project.

After the project plan is updated at 442/446, the current application may notify all parties involved in the project plan of the changes via messaging. This may occur through an email notification, internal company-supported messaging, text messaging, or any other suitable notification sent through the company's network at 448. The message that is sent may include data that reflects the updated project plan at 442/446 in a suitable format so the reader can easily determine the changes that have been made to the project plan, such as new personnel that have been added to the project from outside the organization, current employees in the organization that have been added to the project, etc.

The application may automatically setup a meeting for all parties involved in the project plan change(s) at 450. This may include the parties in the original message, any new employees added to the project, and/or outside personnel added to the project. The application may interface with a calendar application of the user, a company-wide calendar application (if available), or any other suitable scheduling application. The application may also access the calendar data from all attendees that are invited to the meeting through direct access to the data either locally or remotely through network 16, or through published APIs of the scheduling application either locally or remotely through network 16.

Figure 12:
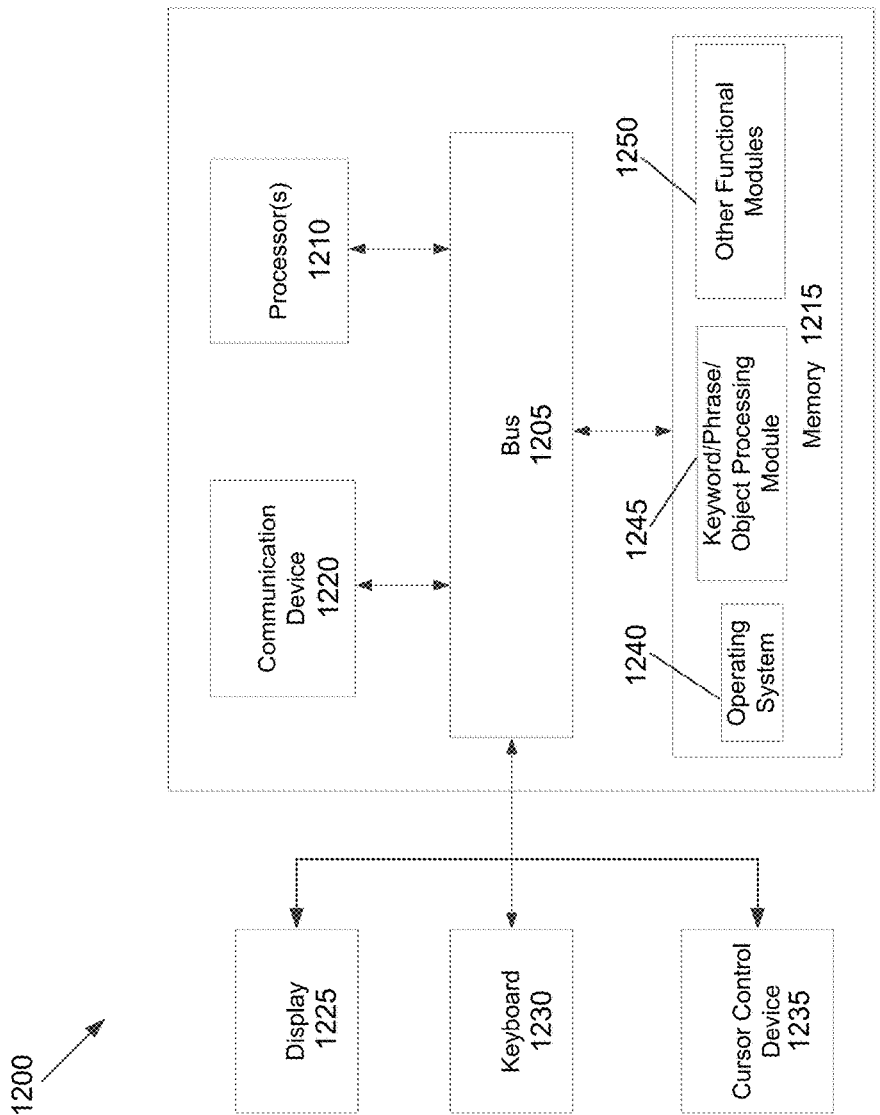
FIG. 12 is a block diagram illustrating a computing system configured to process keywords, phrases, and/or objects, according to an embodiment of the present invention.

FIG. 12 is a block diagram illustrating a computing system 1200 configured to process keywords, phrases, and/or objects, according to an embodiment of the present invention. Computing system 1200 may be, or have the same architecture as, any of the devices discussed herein. Computing system 1200 includes a bus 1205 or other communication mechanism configured to communicate information, and at least one processor 1210, coupled to bus 1205, configured to process information. At least one processor 1210 can be any type of general or specific purpose processor. Computing system 1200 also includes memory 1220 configured to store information and instructions to be executed by at least one processor 1210. Memory 1220 can be comprised of any combination of random access memory ("RAM"), read only memory ("ROM"), static storage such as a magnetic or optical disk, or any other type of computer readable medium. Computing system 1200 also includes a communication device 1215, such as a network interface card, configured to provide access to a network.

The computer readable medium may be any available media that can be accessed by at least one processor 1210. The computer readable medium may include both volatile and nonvolatile medium, removable and non-removable media, and communication media. The communication media may include computer readable instructions, data structures, program modules, or other data and may include any information delivery media.

At least one processor 1210 is coupled via bus 1205 to a display 1225, such as a Liquid Crystal Display ("LCD"). Display 1225 may display information to the user. An input device 1230 is also coupled to bus 1205 to enable the user to interface with computing system 1200.

Memory 1220 stores software modules that provide functionality when executed by at least one processor 1210. The modules include an operating system 1240 and a keyword/phrase/object processing module 1745, as well as other functional modules 1250. Operating system 1240 provides operating system functionality for computing system 1200.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
    parsing, by a parsing language executed by a computing system, keywords, phrases, or both, from text of a message or an object in the message for a word or phrase indicating that the message pertains to a project plan or milestone, wherein the keywords or phrases parsed from the message text comprise users and project deadlines associated with the project plan;
    storing the identified keywords or phrases including the users and project deadlines parsed by the parsing language from the message, by the computing system; and
    when the word or phrase indicates that the message pertains to the project plan or milestone:
        obtaining direct permissions to a project planning application, by the computing system;
        accessing project plan data associated with the project plan, by the computing system;
        retrieving the project plan data, by the computing system, by interworking directly with the project planning application or with application programming interfaces (APIs) of the project planning application;
        performing one or more determinations, by the computing system, based on the project plan data, the one or more determinations comprising whether one or more project resources are unavailable;
        automatically modifying the message to include additional message text to identify the one or more determinations, by the computing system; and
        transmitting the automatically modified message to its intended destination, by the computing system.

2. The computer-implemented method of claim 1, wherein the project plan data is stored in a file that has recently been accessed or edited, is a most recent file in a file system that relates to the project plan application, or is a file that was recently referenced in a recent messaging operation.

3. The computer-implemented method of claim 1, wherein the retrieving of the project plan data provides detailed data regarding a portion of the project plan data.

4. The computer-implemented method of claim 1, wherein the retrieved project plan data comprises XML.

5. The computer-implemented method of claim 1, further comprising:
    locating one or more issues in the message, by the computing system, by analyzing keywords, phrases, and/or objects in the message.

6. The computer-implemented method of claim 1, further comprising:
    determining, by the computing system, current assignments and current deliverable timelines included in the message.

7. The computer-implemented method of claim 1, further comprising:
    determining, by the computing system, that an employee associated with the project plan is leaving prior to a completion date of a project; and
    determining, by the computing system, whether internal resources are available to assist with milestones of the project plan based on the leaving employee's current deliverables.

8. The computer-implemented method of claim 7, further comprising:
    sending a notification to a user, by the computing system, when the internal resources are available.

9. The computer-implemented method of claim 7, further comprising:
    determining, by the computing system, whether internal and/or external resources are available to assist with milestones of the project plan based on the leaving employee's current deliverables; and
    displaying, by the computing system, a proposal to a user and one or more components that permit the user to agree to or modify a proposal regarding the internal and/or external resources on a graphical user interface.

10. The computer-implemented method of claim 9, wherein when the user agrees to the proposal, the method further comprises:
    updating the project plan, by the computing system.

11. The computer-implemented method of claim 7, wherein when internal resources are not available, the method further comprises:
    seeking external resources, by the computing system, by interworking with external data through published APIs or directly with remote data through a network to determine external resources that are currently related to the project plan.

12. The computer-implemented method of claim 11, further comprising:
notifying a user, by the computing system, via a notification message when the external resources are available.

13. The computer-implemented method of claim 12, wherein the notification message comprises credentials of external candidates, contact information, and/or employment history.

14. A computer program embodied on a non-transitory computer-readable medium, the program configured to cause at least one processor to:
parse, by a parsing language executed by the processor, keywords, phrases, or both, from text of a message or an object in the message for a word or phrase indicating that the message pertains to a project plan or milestone, wherein the keywords or phrases from the message text comprise users and project deadlines associated with the project plan;
store the identified keywords or phrases including the users and project deadlines parsed from the message; and
when the word or phrase indicates that the message pertains to the project plan or milestone:
obtain direct permissions to a project planning application;
access project plan data associated with the project plan;
retrieve the project plan data by an interwork with the project planning application or with application programming interfaces (APIs) of the project planning application;
perform one or more determinations based on the project plan data, the one or more determinations comprising whether one or more project resources are available;
automatically modify the message to include additional message text to identify the one or more determinations; and
transmit the automatically modified message to its intended destination.

15. The computer program of claim 14, wherein the program is further configured to cause the at least one processor to locate one or more issues in the message by analyzing keywords, phrases, and/or objects in the message.

16. The computer program of claim 14, wherein the program is further configured to cause the at least one processor to:
determine that an employee associated with the project plan is leaving prior to a completion date of a project;
determine whether internal resources are available to assist with milestones of the project plan based on the leaving employee's current deliverables;
when the internal resources are not available, seek external resources by an interwork with external data through published APIs or directly with remote data through a network to determine external resources that are currently related to the project plan; and
notify a user when the internal resources or the external resources are available.

17. The computer program of claim 16, wherein the program is further configured to cause the at least one processor to:
determine whether internal and/or external resources are available to assist with milestones of the project based on the leaving employee's current deliverables; and
display a proposal to the user and a one or more components that permit the user to agree to or modify a proposal regarding the internal and/or external resources on a graphical user interface.

18. An apparatus, comprising:
memory storing computer program instructions; and
at least one processor communicably coupled to the memory and configured to execute the computer program instructions, wherein the at least one processor is configured to:
process a message to identify whether any project plan related information is included in the message by executing a parsing language,
retrieve the project plan data by an interwork directly with a project planning application or with application programming interfaces (APIs) of the project planning application,
perform one or more determinations based on the project plan data, the one or more determinations comprising whether one or more project resources are unavailable, including a determination that an employee is leaving prior to a completion date of the project,
determine whether internal resources are available to assist with milestones of the project based on current deliverables of the leaving employee,
when the internal resources are not available, seek external resources by interworking with external data through published APIs or directly with remote data through a network to determine external resources that are currently related to the project,
automatically modify the message to include additional message text to identify the one or more determinations,
transmit the automatically modified message to its intended destination, and
notify a user when the internal resources or the external resources are available.

* * * * *